United States Patent Office 3,564,074
Patented Feb. 16, 1971

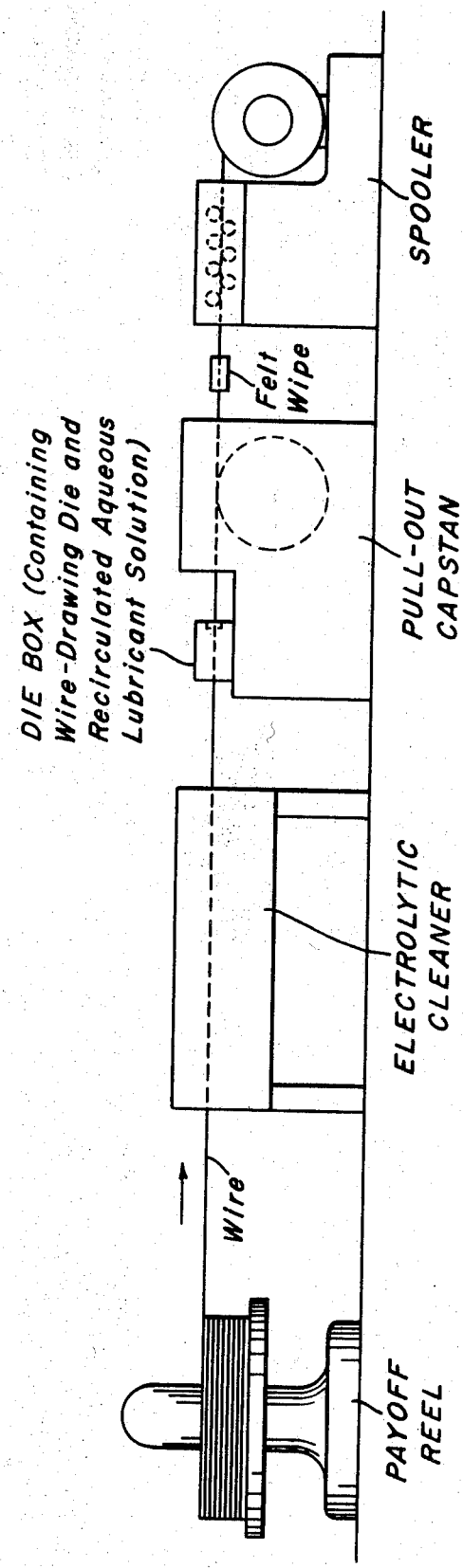

---

3,564,074
THERMOSETTING VINYL RESINS REACTED WITH DICARBOXYLIC ACID ANHYDRIDES
David H. Swisher and David C. Garms, Lake Jackson, Tex., assignors to The Dow Chemical Company, Midland, Mich., a corporation of Delaware
No Drawing. Filed Nov. 28, 1966, Ser. No. 597,233
Int. Cl. C08f 45/04
U.S. Cl. 260—837    13 Claims

---

ABSTRACT OF THE DISCLOSURE

The present invention relates to new thermosetting resin compositions prepared by reacting a polyepoxide with an ethylenically unsaturated monocarboxylic acid and then reacting a dicarboxylic acid anhydride with the secondary hydroxyl groups formed by the epoxide-carboxylic acid interaction. The resin may be blended with a polymerizable monomer.

---

This invention relates to novel thermosetting vinyl ester resin compositions, their preparation and products of the compositions. More particularly it relates to thermosetting resin compositions comprising a blend of (A) up to 70 percent by weight of polymerizable monomer containing a $>C=CH_2$ group, and (B) at least 30 percent by weight of vinyl ester resin prepared by reaction of (1) an ethylenically unsaturated monocarboxylic acid, (2) a polyepoxide and (3) a dicarboxylic acid anhydride.

The vinyl ester resins are polymerizable low molecular weight resins with a high capacity for inert fillers and reinforcing media. Additional advantages and improvements in these thermosetting resins of special interest to the reinforced plastic industry include higher heat distortion temperatures, better glass wetting, rapid curing and improved surface smoothness and resistance to stress cracking in the cured articles. Other advantages and objects of the invention will be apparent from the following description.

Broadly defined, the vinyl ester resins of the present invention are prepared (1) by contacting a polyepoxide with an ethylenically unsaturated monocarboxylic acid to produce a reaction product which contains, in part, the functional group

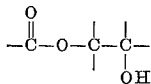

produced by the interaction of an epoxide group with a carboxylic acid group, and (2) by further condensation of the secondary hydroxyl groups contained in the above reaction product with a dicarboxylic acid anhydride to produce pendant half ester groups. The resulting vinyl ester resin may then be admixed with a polymerizable monomer containing a $>C=CH_2$ group.

Any of the known polyepoxides can be employed in the preparation of the vinyl ester resins of this invention. Useful polyepoxides are glycidyl polyethers of both polyhydric alcohols and polyhydric phenols, epoxy novolacs, epoxidized fatty acids or drying oil acids, epoxidized diolefins, epoxidized di-unsaturated acid esters, epoxidized unsaturated polyesters and mixtures thereof so long as they contain more than one epoxide group per molecule. The polyepoxides may be monomeric or polymeric.

Within the scope of this invention, a number of polyepoxide modifications can be readily made. It is possible to increase the molecular weight of the polyepoxide by polyfunctional reactants which react with the epoxide group and serve to link two or more polyepoxide molecules. A dicarboxylic acid, for example, can be reacted with a diepoxide, such as the diglycidyl ether of a bisphenol, in such a manner so as to join two or more diepoxide molecules and still retain terminal epoxide groups. Other polyfunctional reactants include diisocyanates, dicarboxylic acid anhydrides and those reactants which contain functional groups which will react with the epoxide group.

Where polyhydric phenols are selected to prepare the polyepoxide, many structural embodiments are possible. Polyepoxides prepared from polyhydric phenols may contain the structural group

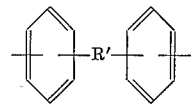

wherein R' is a diavlent hydrocarbon radical such as

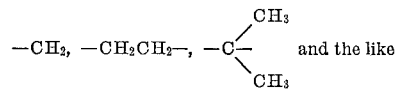

or R' is

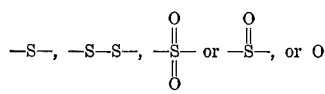

The choice of novolak resins leads to a separate, well recognized class of epoxy novolak resins. Other modifications are well known to those skilled in the art.

Further, it is well recognized that flame retardancy properties can be obtained by the introduction of phosphorus and halogen into the epoxy resin itself or by the selection of fillers, extenders, curing agents and the like which contribute to the flame retardant properties. For example, high levels of bromine can be introduced into the resin by the use of tetrabromo bisphenol A.

The polyepoxides referred to as epoxidized diolefins, epoxidized fatty acids, etc., are generally made by the known peracid method where the reaction is one of epoxidation of compounds with isolated double bonds at a controlled temperature so that the acid resulting from the peracid does not react wtih the resulting epoxide group to form ester linkages and hydroxyl groups. Preparation of polyepoxides by the peracid method is described in various periodicals and patents and such compounds as butadiene, ethyl linoleate, polyunsaturated drying oils or drying oil esters can all be converted to polyepoxides.

While the invention is applicable to polyepoxides generaly, prefererd polyepoxides are glycidyl polyethers of polyhydric alcohols or polyhydric phenols having weights per epoxide group of 150 to 2000. These polyepoxides are usually made by reacting at least about two moles of an epihalohydrin or glycerol dihalohydrin with one mole of the polyhydric alcohol or polyhydric phenol, and a sufficient amount of a caustic alkali to combine with the halogen of the halohydrin. The products are characterized by the presence of more than one epoxide group, i.e., a 1,2-epoxy equivalency greater than one.

Ethylenically unsaturated monocarboxylic acids suitable for reaction with the polyepoxide include the α,β-unsaturated monocarboxylic acids and the hydroxyalkyl acrylate or methacrylate half esters of dicarboxylic acids. The α,β-unsaturated monocarboxylic acids include acrylic acid, methacrylic acid, crotonic acid, cinnamic acid and the like. The hydroxyalkyl groups of the acrylate or methacrylate half esters preferably contains from two to six carbon atoms and includes such groups as hydroxyethyl, beta-hydroxypropyl, beta-hydroxybutyl and the like. It is also intended to include those hydroxyalkyl groups in which an ether oxygen is present. The dicarboxylic acids can be either saturated or unsaturated. Saturated acids include phthalic acid, chlorendic acid, tetrabromophthalic acid, adipic acid, succinic acid, glutaric acid and the like. Unsaturated dicarboxylic acids include maleic acid, fumaric acid, citraconic acid, itaconic acid, halogenated maleic or fumaric acids, mesaconic acid and the like. Mixtures of ethylenically unsaturated carboxylic acids may be used.

Preferably, the half esters are prepared by reacting substantially equal molar proportions of a hydroxyalkyl acrylate or methacrylate with a dicarboxylic acid anhydride. Preferred unsaturated anhydrides include maleic anhydride, citraconic anhydride, itaconic anhydride and the like and preferred saturated anhydrides include phthalic anhydride, tetrabromophthalic anhydride, chlorendic anhydride and the like. Advantageously, a polymerization inhibitor, such as the methyl ether of hydroquinone or hydroquinone, may be added since elevated temperatures are useful in preparing the half esters. The reaction temperature may range from 20° to 150° C., but preferably from 80° to 120° C.

The polyepoxide is reacted with the ethylenically unsaturated monocarboxylic acid either with or without a solvent at a temperature of 20° to 120° C. The reaction may also be conducted in the presence or absence of suitable catalysts such as alcoholates, tertiary amino phenols or others well known to the art. Preferably, the polyepoxide is added in an amount sufficient to provide about 0.8 to 1.2 equivalents of epoxide per equivalent of carboxylic acid. The reaction is continued until the acid content (as —COOH) drops below about 2 percent by weight.

The ethylenically unsaturated monocarboxylic acid-polyepoxide reaction product containing secondary hydroxyl groups is further reacted with about 0.1 to 1.2 mole proportions of dicarboxylic acid anhydride per equivalent of epoxide. The dicarboxylic acid anhydride may be selected from either the saturated or unsaturated dicarboxylic acid anhydrides previously recited or mixtures thereof. A reaction temperature from about 25° to 150° C. is suitable, but about 80° to 120° C. is preferred. Advantageously, a suitable vinyl polymerization inhibitor such as the methyl ether of hydroquinone or hydroquinone and the like may be added. Following completion of the reaction, the reaction mixture is cooled and the polymerizable monomer may be blended therewith.

A wide selection of polymerizable monomers containing the $>C=CH_2$ group is available from the many known classes of vinyl monomers. Representative species are the vinyl aromatic compounds which include such monomers as styrene, vinyl toluene, halogenated styrenes, divinyl benzene and the like.

Other valuable monomers include the methyl, ethyl, isopropyl, octyl, etc., esters of acrylic or methacrylic acid, vinyl acetate, diallyl maleate, dimethallyl fumarate, acidic monomers such as acrylic acid, methacrylic acid, crotonic acid and amide monomers such as acrylamide, N-alkyl acrylamides and the like and mixtures thereof.

Preferred polymerizable monomers containing the $>C=CH_2$ group are styrene, vinyl toluene, ortho-, meta- and para-halostyrenes, vinyl naphthalenes, the various alpha-substituted styrenes, as well as the various di-, tri- and tetrahalo styrenes, and acrylic, methacrylic and crotonic acid esters which include both the saturated alcohol esters and the hydroxyalkyl esters.

The blended vinyl ester resin composition may consist of up to 70 percent by weight of polymerizable monomer containing the $>C=CH_2$ group with the balance of the combined weight consisting of said vinyl ester resin. Preferably, the resin composition consists of 30–60 percent by weight of said monomer and 70–40 percent by weight of said vinyl ester resin.

While it is preferred in many applications to blend the vinyl ester resin with a polymerizable monomer, the present invention is not limited thereto. The vinyl ester resin can be cured and polymerized in the absence of such a monomer and can be applied and utilized as solutions in a nonpolymerizable solvent, such as is practiced in certain coating operations.

According to the present invention, the curing of the resin compositions is effected by the application of heat and/or pressure in the presence of a free radical yielding catalyst. Catalysts that may be used for the curing or polymerization are preferably the peroxide catalysts, such as benzoyl peroxide, lauroyl peroxide, t-butyl hydroperoxide, t-butylperbenzoate, methyl ethyl ketone peroxide, potassium persulfate and the like. The amount of the catalyst added will preferably vary from 0.1 to about 5 percent by weight of reactants. Temperatures employed may vary over a considerable range but usually are in the range of 20° to 250° C.

Additionally, more rapid curing of the thermosetting resin compositions may be accomplished by the addition of accelerating agents such as lead or cobalt naphthenate, dimethylaniline and the like, usually in concentrations ranging from 0.1 to 5.0 weight percent.

The relatively low molecular weight of the vinyl ester resins of the present invention along with the rapid gel time, high heat distortion and fast cure rate of the thermosetting resin compositions provide many advantages and improved properties in a wide variety of applications.

Pottings and castings are conveniently made by the addition of suitable curing agents and accelerating agents to the resin composition followed by pouring into an appropriate mold or casting and curing at room temperature. Heat may be applied to hasten the cure. Such cured castings have excellent flexural and tensile strength, good impact resistance and develop smooth, hard surfaces.

In addition, the resultant lower viscosity of said resin compositions allows the incorporation of up to as much as 75 percent by weight or more of inert additives and fillers such as glass, metal filings and inorganic fillers such as sand or clay. The resin compositions, in spite of this heavy loading, exhibit excellent flow characteristics in the molding operation. Frequently such fillers are added to further improve and vary the useful properties of the cured compositions. Such cured products develop excellent hardness, strength, weatherability and solvent resistance. Other commonly used additives, such as pigments, release agents, plasticizers and the like, may be advantageously added.

Of particular utility is the use of the present invention in the preparation of reinforced plastic and laminate structures. Reinforcing media may be chosen from many well known suitable materials such as glass cloth and matting, paper, asbestos paper, mica, fabrics and the like. Suitable fillers, previously described, are frequently used to provide improved properties. For example, clays are suggested where improved exterior weathering properties are require. In addition to the advantages and improved properties already recited, this invention provides better glass wetting and increased resistance to stress cracking than unsaturated polyester resins.

EXAMPLE 1

Into a reaction vessel suitably equipped with a means for stirring, refluxing, temperature control, etc. were placed 4.06 pounds of beta-hydroxyethyl acrylate and 5.18 pounds of phthalic anhydride. The vessel was heated to 80° C. for one-half hour and then maintained at 115° C. until the acid content (as —COOH) was about 17.5 percent by weight (about three hours). After cooling to 60° C., 6.12 pounds of a diglycidyl ether of 4,4'-isopropylidene diphenol (having an epoxide equivalent weight of about 175) and 19.86 grams of DMP–30 (2,4,6-tri(dimethylaminomethyl)phenol) were added. The reaction mixture was digested at 110° C. until the acid content dropped to about 1 percent by weight (about two and two-thirds hours). After cooling to 60° C., 3.43 pounds of maleic anhydride was added along with 12.807 grams of mono-tertiarybutyl hydroquinone. The reaction mixture was digested at 100° C. until the acid content was about 10 percent by weight (about one hour). This corresponds to about a 100 percent conversion of alcohol groups to pendant maleate half ester groups. The reaction product was cooled to 60° C. and 18.8 pounds of styrene blended therewith.

A portion of this resin was mixed with 1 percent by weight of benzoyl peroxide and cured at 250° F. (121° C.). The following SPI gel data was obtained (reference, Handbook of Reinforced Plastics of the Society of the Plastics Industry, Inc., Reinhold Publishing Corp., New York, 1964, pp. 51 and 52).

Gel time—0.98 minute
Peak time—1.95 minutes
Peak temperature—588° F. (267° C.)

A clear casting was prepared using benzoyl peroxide as the catalyst and tested according to industry standards with the results shown below.

Flexural strength—16,900 p.s.i.
Tensile strength—8,400 p.s.i.
Heat distortion—235° F. (113° C.)
Toluene absorption—0.007%
Water absorption—0.174%

Similar results are obtained when the pendant half ester groups are formed by reaction with phthalic anhydride in place of maleic anhydride.

EXAMPLE 2

Into a reaction vessel suitably equipped with a means for stirring, refluxing, temperature control, etc. were placed 232 grams (2 moles) of beta-hydroxyethyl acrylate and 196 grams (2 moles) of maleic anhydride. The vessel was heated to 100° C. and allowed to react at that temperature until the acid content was about 21 percent by weight (as —COOH). Then, 350 grams of diglycidyl ether of 4,4'-isopropylidene diphenol (having an epoxide equivalent weight of about 175), 2 grams of DMP-30 and 0.112 gram of hydroquinone were added. The vessel was heated and maintained at 100° C. until the acid content dropped to about 1 percent by weight. After cooling to 60° C., 117.6 grams (1.2 moles) of maleic anhydride were added and then disgested at 100° C. for about two to three hours. This corresponds to about a 60 percent conversion of alcohol groups to pendant maleate half ester groups. The reaction product was then cooled to 70° C. and 1347 grams of styrene was blended therewith.

Similar resins are obtained when the beta-hydroxyethyl acrylate is reacted with phthalic anhydride in place of maleic anhydride.

EXAMPLE 3

In a 10-gallon stainless steel vessel equipped with an agitator, a reflux condenser, temperature control, etc., were placed 16.32 pounds ofr cinnamic acid, 19.84 pounds of D.E.N. 438 (a commercially-available epoxy novolac resin having an epoxide equivalent weight of about 178), 22.5 milliliters of DMP-30 and 1.82 grams of hydroquinone. The vessel was heated to 105° C. and held thereat for about 10 hours. After cooling to 60° C., 3.6 pounds of maleic anhydride were added and the mixture heated to 100° C. for about 1.5 hours. This corresponds to about a 30 percent conversion of alcohol groups to pedant maleate half ester groups. After cooling, 39.76 pounds of styrene were blended with the vinyl ester resin.

SPI gel data at 250° F. (121° C.) (1% by wt. benzoyl peroxide)

Gel time—1.81 minutes
Peak time—2.50 minutes
Peak temperature—434° F. (223° C.)

The physical properties of this resin cured with 1 percent by weight benzoyl peroxide at 80° C. overnight and for 45 minutes at 121° C. were as follows:

Flexural strength—11,700 p.s.i.
Flexural modulus—4.64×10⁵ p.s.i.

Barcol hardness—43
Heat distortion—230° F. (110° C.)

EXAMPLE 4

In a reaction vessel equipped with a means for stirring, refluxing, temperature control, etc., were placed 6.5 pounds of acrylic acid, 17.5 pounds of diglycidyl ether of 4,4'-isopropylidene diphenol (having an epoxide equivalent weight of about 175) and 19.9 grams DMP-30. The mixture was heated at 100° C. until the acid content was about 1 percent by weight. After cooling, 9.8 pounds of maleic anhydride and 18.4 grams of monotertiarybutyl hydroquinone were added. The mixture was then heated at 100° C. for about two hours. This corresponds to about a 100 percent conversion of alcohol groups to pendant maleate half ester groups. The product was then cooled and blended with 33.8 pounds of styrene.

Portions of this resin were mixed with 1 percent by weight benzoyl peroxide and the following physical properties obtained:

SPI gel data at 250° F. (121° C.)

Gel time—0.88 minute
Peak time—1.49 minutes
Peak temperature—577° F. (303° C.)

Cured castings

Flexural strength—12,100 p.s.i.
Tensile strength—7,350 p.s.i.
Heat distortion—303° F. (151° C.)
Water absorption—0.22%
Toluene absorption—0.14%

Similar results are obtained when methacrylic acid is utilized in place of acrylic acid.

EXAMPLE 5

A resin similar to that of Example 3 was prepared using beta-hydroxypropyl acrylate in place of beta-hydroxyethyl acrylate and curable compositions were prepared in which the styrene was replaced by vinyl toluene, ortho-chlorostyrene and methyl methacrylate.

We claim:
1. A thermosetting resin composition comprising:
  (A) at least 30 percent by weight of a vinyl ester resin wherein the resin is prepared by (1) first reacting an ethylenically unsaturated monocarboxylic acid with a polyepoxide, and then (2) reacting a dicarboxylic acid anhydride with the secondary hydroxyl groups formed from the epoxide-carboxylic acid reaction to provide pendant half ester groups, said reactants combined in the proportion of about 0.8 to 1.2 equivalents of epoxide per equivalent of carboxylic acid and about 0.1 to 1.2 moles of dicarboxylic acid anhydride per equivalent of epoxide; and
  (B) up to 70 percent by weight of a polymerizable monomer containing a $>C=CH_2$ group.
2. The composition of claim 1 wherein the ethylenically unsaturated monocarboxylic acid is acrylic acid, methacrylic acid or cinnamic acid.
3. The composition of claim 1 wherein the ethylenically unsaturated monocarboxylic acid is the hydroxyalkyl acrylate or methacrylate half ester of a dicarboxylic acid.
4. The composition of claim 3 wherein the half ester is a maleic acid half ester.
5. The composition of clam 3 wherein the half ester is a phthalic acid half ester.
6. The composition of claim 1 wherein the polyepoxide is the glycidyl polyether of a polyhydric alcohol or a polyhydric phenol.
7. The composition of claim 6 wherein the polyepoxide is the glycidyl polyether of 4,4'-isopropylidene diphenol.
8. The composition of claim 6 wherein the polyepoxide is an epoxy novolac.

9. The composition of claim 1 wherein the dicarboxylic acid anhydride is phthalic anhydride or maleic anhydride.

10. The composition of claim 1 wherein the polymerizable monomer is selected from the group consisting of vinyl aromatic monomers, hydroxyalkyl esters of acrylic and methacrylic acid, alkyl esters of acrylic and methacrylic acids, acrylic and methacrylic acid.

11. A resin comprising the polymerized product of the composition of claim 1.

12. A method for preparing a thermosetting resin composition which comprises
  (A) reacting a polyepoxide with an ethylenically unsaturated monocarboxylic acid in the proportions of 0.8 to 1.2 equivalents of epoxide per equivalent of carboxylic acid,
  (B) further reacting the secondary hydroxyl groups formed by the epoxide-carboxylic acid reaction with a dicarboxylic acid anhydride to provide pendant half ester groups, and
  (C) blending the resin with up to 70 percent by weight of the combined weight of a polymerizable monomer containing a $>C=CH_2$ group.

13. A thermosetting resin composition comprising a vinyl ester resin wherein the resin is prepared by
  (1) first reacting an ethylenically unsaturated monocarboxylic acid with a polyepoxide and then
  (2) reacting a dicarboxylic acid anhydride with the secondary hydroxyl groups of the vinyl ester to provide pendant half-ester groups, said reactant being combined in the proportion of about 0.8 to 1.2 equivalents of epoxide per equivalent of carboxylic acid and at least 0.1 mole of dicarboxylic acid anhydride per equivalent of epoxide.

References Cited
UNITED STATES PATENTS

| | | | |
|---|---|---|---|
| 3,256,266 | 6/1966 | Fekete | 260—837 |
| 3,373,075 | 3/1968 | Fekete | 260—837 |
| 3,373,221 | 3/1968 | May | 260—836 |
| 3,377,406 | 4/1968 | Deney | 260—836 |

PAUL LIEBERMAN, Primary Examiner

U.S. Cl. X.R.

260—18, 23, 37, 41, 47, 78.4, 78.5, 836